United States Patent
Pancholi et al.

(10) Patent No.: US 11,263,701 B2
(45) Date of Patent: Mar. 1, 2022

(54) SYSTEMS AND METHODS FOR LOCATING OBJECTS AND RELATED FACILITIES

(71) Applicant: Jenny Life, Inc., Seattle, WA (US)

(72) Inventors: Chirag Pancholi, Seattle, WA (US); Lief Larson, Seattle, WA (US)

(73) Assignee: Jenny Life, Inc., Seattle, WA (US)

( * ) Notice: Subject to any disclaimer, the term of this patent is extended or adjusted under 35 U.S.C. 154(b) by 0 days.

(21) Appl. No.: 17/237,006

(22) Filed: Apr. 21, 2021

(65) Prior Publication Data

US 2021/0366050 A1 Nov. 25, 2021

Related U.S. Application Data

(63) Continuation of application No. 16/290,526, filed on Mar. 1, 2019, now abandoned.

(60) Provisional application No. 62/637,065, filed on Mar. 1, 2018.

(51) Int. Cl.
  *G06Q 30/00* (2012.01)
  *G06Q 40/08* (2012.01)
  *G06Q 30/02* (2012.01)
  *G06F 3/0481* (2013.01)

(52) U.S. Cl.
  CPC ........... *G06Q 40/08* (2013.01); *G06F 3/0481* (2013.01); *G06Q 30/0234* (2013.01)

(58) Field of Classification Search
  None
  See application file for complete search history.

(56) References Cited

U.S. PATENT DOCUMENTS

| | | | | |
|---|---|---|---|---|
| 7,792,297 B1* | 9/2010 | Piccionelli | ............. | H04L 63/10 380/258 |
| 2002/0143938 A1* | 10/2002 | Alexander | ............. | H04L 67/00 709/224 |
| 2005/0027628 A1* | 2/2005 | Lammersdorf | ........ | G06Q 40/00 705/35 |
| 2010/0103173 A1* | 4/2010 | Lee | ...................... | H04N 5/2224 345/427 |
| 2013/0201344 A1* | 8/2013 | Sweet, III | .......... | H04N 1/00183 348/169 |
| 2015/0134388 A1* | 5/2015 | Yoo | ................ | G06Q 10/063112 705/7.14 |
| 2015/0193872 A1* | 7/2015 | Ivanoff | .................. | G16H 50/20 705/38 |
| 2015/0213568 A1* | 7/2015 | Follis | .................... | H04L 63/101 705/311 |

(Continued)

OTHER PUBLICATIONS

IP.com Search Strategy dated Jun. 23, 2021. (Year: 2021).*
IP.com Search Strategy dated Jun. 24, 2021 (Year: 2021).*
STIC EIC 3600 Search Report dated Jun. 28, 2021 (Year: 2021).*

*Primary Examiner* — Matthew T Sittner

(74) *Attorney, Agent, or Firm* — Perkins Coie LLP

(57) ABSTRACT

The disclosure relates to interactive and adaptive systems and methods for tracking location-sensitive objects. An example method includes presenting a first set of user interfaces for receiving a visual image of the location-sensitive object, and using the image to determine an identifier and identify a geographic location. The example method also includes transmitting the identifier and the location to a remote computing device, and in response to receiving location-specific requirements. A second set of user interfaces may be generated and presented to guide a user to comply with the location-specific requirements.

12 Claims, 6 Drawing Sheets

(56) References Cited

U.S. PATENT DOCUMENTS

2018/0096417 A1* 4/2018 Cook .................... G06F 16/953

* cited by examiner

SYSTEMS AND METHODS FOR LOCATING OBJECTS AND RELATED FACILITIES

This application is related to U.S. patent application Ser. No. 16/290,526, filed on Mar. 1, 2019, which claims the benefit of U.S. Provisional Application No. 62/637,065, filed on Mar. 1, 2018, which are incorporated herein by reference in their entireties.

TECHNICAL FIELD

The disclosed technology relates generally to systems and methods for locating and tracking objects in relation to corresponding facilities, and in particular to systems, methods, and software applications for mobile devices for the locating and tracking process.

BACKGROUND

Applying for services typically involves many rigid steps as involved parties needs to carefully collect, inspect and weigh application information to decide whether an applicant is a good risk and price it according. Accordingly, obtaining certain services can be challenging to market at a retail level in general or non-specific service locations.

SUMMARY

In some aspects, the presently disclosed technology is directed to a novel method to collect, monitor, and facilitate redemption of a physical objects via a mobile application.

In some aspects, the presently disclosed technology is directed to unique methods to monitor and facilitate redemption of an incentive based on application and issuance of an insurance policy based on interactions with an insurance carrier.

In some aspects, the presently disclosed technology is directed to a novel method of associating a physical object (e.g., a piece of retail marketing collateral) with a mobile application that identifies the market collateral to a specific consumer and a specific retail location specifically for the purposes of redemption of an incentive.

In some embodiments, a computer-implemented method is performed by a portable computing device that is configured to communicate with at least one remote computing device. The method includes presenting a first set of user interfaces for inputting retail card information and receiving image data from a user in response to the user's interaction with the first set of user interfaces. The portable computing device can identify personally identifiable information based, at least in part, on the received image data, and transmitting the retail card information and personally identifiable information to the at least one remote computing device. The personally identifiable information is analyzed based, at least in part, on communication between the remote computing device and one or more third-party computing resources.

The method can further include receiving instructions from the at least one remote computing device for generating a second set of user interfaces based, at least in part, on the analysis of the retail card information and/or personally identifiable information. Additional data from the user can be received in response to the user's interaction with the second set of user interfaces. Still further, the method can include, concurrently with presenting the second set of user interfaces, transmitting at least a portion of additional data to the at least one remote computing device. The additional data can be analyzed based, at least in part, on communication between the remote computing device and one or more third-party computing resources. A result for the application for insurance based, at least in part, on the analysis of the at least a portion of the additional data can be provided. Additionally or alternatively, the additional data can include information associated with the retail card. The information can include location data (e.g., GPS data), a user's preferred reward option, or the like.

In some embodiments, the method is completed without need for the user to manually type or key in textual information. In some embodiments, the method further includes receiving instructions from the at least one remote computing device for generating a third set of user interfaces based, at least in part, on the analysis of the at least a portion of the additional data. In some embodiments, providing a result for the application for insurance is further based on the user's interaction with the third set of user interfaces. In some embodiments, the third set of user interfaces is based on the retail card information.

At least some embodiments of the technology are systems and methods for insurance policy underwriting based on a retail card and accelerated validation. The systems and methods can provide applicants with an insurance policy application process that includes application completion, review, acceptance, and/or policy underwriting within a short period of time. Once completed, an incentive associated with the unique retail card can be provided to the user. The systems and methods can help advertise in a wide range of retail settings and reduce the consumer inputs and efforts required to apply for and to receive an insurance policy. Accordingly, the systems and methods can minimize or limit consumer frustration, consumer abandonment, and/or consumer mortality risks.

In some embodiments, a system is configured to allow applicants to rapidly complete an application process by employing automated, rapid, and synchronous steps. For example, a mobile device can be used to obtain information for the application process to avoid, limit, or minimize manually inputted information. In some applications, the mobile device can capture one or more images or videos of objects, such as reverse gift cards, passports, documents (e.g., birth certificates, social security cards, etc.), driver's license, or other objects with personally identifiable information, to obtain most or all of the information for the application process.

In further embodiments, a system includes at least a memory storing computer-executable instructions and one or more processors that, when executing the instructions, are configured to receive retail card information and/or image data from a user and to identify personally identifiable information based, at least in part, on the received image data. The one or more processors are configured to (1) cause first analysis of the retail card information and/or personally identifiable information, (2) present one or more user interfaces based, at least in part, on the first analysis, (3) receive additional data from the user via the one or more user interfaces, (4) concurrently with presenting the one or more user interfaces, cause second analysis of at least a portion of the additional data and/or the personally identifiable information, and (5) determine a result for insurance application based, at least in part, on the second analysis. Additional steps based on the retail card information can also be performed.

DETAILED DESCRIPTION

Figure 1:
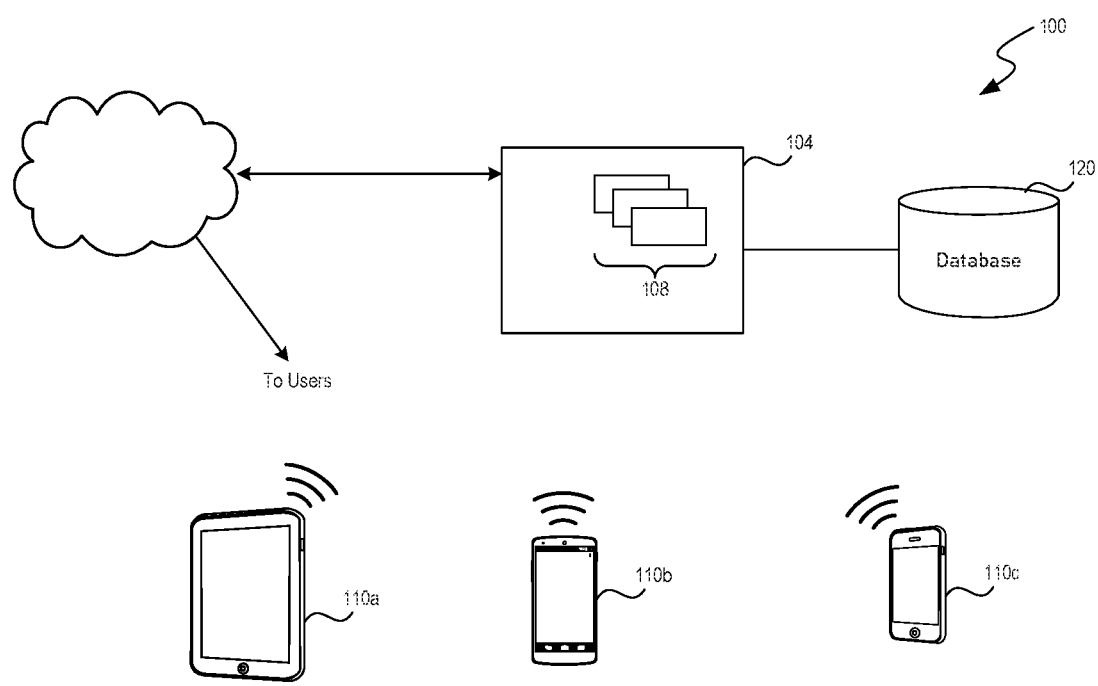
FIG. 1 is a block diagram of an example system for implementing a mobile insurance application in accordance with some embodiments of the disclosed technology.

The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some steps, well-known structures, or functions may not be shown or described in detail below, to avoid unnecessarily obscuring the relevant description.

Traditionally the life insurance application process has been relegated to health exams and blood draws as part of the underwriting process to cover applicants. A mobile application can help enable consumers to apply for and be underwritten for life insurance policies. In some embodiments, life insurance policies can be issued without blood draws, urine samples, invasive testing, or the like.

One of the most difficult challenges in consumers obtaining insurance is that the application process can be arduous, take many weeks, and in some cases even requires blood testing. These long, rigid, and often complicated insurance application processes can make it a challenging task to market insurance products (e.g., life insurance) at a retail level in non-insurance company owned store locations. To address at least these problems, systems and methods for implementing novel reverse gift card technologies are disclosed herein.

Gift cards are often purchased at various retailer locations and can be redeemed at card designated merchants (e.g., Olive Garden, iTunes Store, Amazon.com, or the like). They are typically purchased for a dollar value (also known as stored value) at the retailer. In accordance with various embodiments of the presently disclosed technology, a gift card (hereinafter generally referred to as "reverse gift card") can be given away (rather than purchased) at a retailer. Illustratively, the "reverse gift cards" can be presented to consumers at the retail checkout or display section on the retail aisle. At time of check-out, the consumer can have the card scanned (e.g., by a salesperson) at point-of-sale (POS) with zero cost to register the possession of the card via the specific retailer.

The consumer can take the card home, scratch off a portion of the back to reveal a unique card ID (e.g., in the form of an alpha-numerical code, a bar code, a QR code, or the like). Illustratively, the consumer/applicant can input the unique card ID into a mobile app for applying for and/or purchasing life insurance. Upon completion of the application process and/or obtaining coverage of life insurance, a traditional gift card (e.g., VISA gift card of $25), a branded gift card (e.g., branded based on where the retail card was displayed), a form of digital or virtual currency, and/or other forms of monetary rewards will be sent to the consumer/applicant/insured. In some cases, the monetary reward will be sent after a period of money back guarantee period associated with the life insurance expires and/or after certain other condition(s) are satisfied.

FIG. 1 illustrates a representative operating environment 100 for purchasing insurance in accordance with some embodiments of the presently disclosed technology. One or more server computers 104 include one or more programmed processors that execute instructions to send and receive information to a number of mobile devices 110a, 110b, 110c (collectively "mobile devices 110"). Each mobile device 110 can be a smart phone, tablet, or other portable computing device capable of running one or more applications (e.g. an "app"). A user can download the app from an app store, e.g. Apple iTunes (not shown). The app store can load a sequence of program instructions and other files onto the mobile devices 110 directly or onto another computer that in turn loads the app onto the mobile devices. When the app is run, a programmed processor within the mobile device 110 executes the instructions to present a number of user interface (UI) screens to the user in which the user can operate the mobile device 110 and information can be entered, displayed and passed back and forth between the mobile device 110 and the server computer 104 via a computer communication link.

In the insurance application, underwriting, and/or purchasing process, a consumer can use an application on his/her mobile device 110 (or computer) to apply for an insurance product with a reverse gift card as incentive. Using a camera (e.g., to extract information from a bar code or QR code) or manual inputting (e.g., typing or keying an alphanumerical code), the application can obtain the unique card ID of the consumer's reverse gift card. Depending on how the incentive is set up and/or how the application process is tailored to individual applicants' identity, location, status, health condition, medical history, or other information collected during the process, the application process can provide UIs in different form, content, sequence, and/or quantity, to different applicants as part of the entirety of the insurance application process.

The server computer 104 can maintain a database 120 that stores records of the unique card IDs as well as information associated with each unique card ID (e.g., an associated retail location, incentive process, reward value, applicable insurance product(s), or the like). When a reverse gift card was generated, an unused unique card ID was retrieved from the database to be associated with the reverse gift card.

Once the unique card ID is obtained by the mobile device application, the unique card ID is linked to or otherwise associated to the specific mobile application exclusively. The mobile application transmits the unique card ID to the server computer 104, which verifies the obtained unique card ID against the records maintained by the database 120 and retrieves applicable information associated with the verified unique card ID. The server computer 104 can transmit the retrieved information to the mobile device application to configure and/or update various UIs that incorporate an incentive process associated with the consumer's reverse gift card.

For example, the applicable information associated with the verified unique card ID can include a location where the card was retailed. Illustratively, before and/or when cards are distributed to the retail store, the database 120 can store the unique ID of each card in connection with the specific retail store. When a consumer redeems the card by inputting a unique card ID from the back of the card into the mobile application, the card and its retailer economic compensation (e.g., SPIFF/SPIV) can then be associated with the specific retail store and tied to a specific consumer purchase of life insurance.

In some embodiments, the association between the unique card ID and a specific retail location can be achieved via geo fencing based on the consumer's mobile device that runs the mobile application. In these embodiments, the database 120 may not have pre-generated association records that link each unique ID with a specific retail store. Rather, the association can be established based on geo fencing data of the consumer's mobile device when it is present in a particular retail location.

The data base 120 can also store records for a number of consumers. In one embodiment of the system, each consumer is identified by a unique identifier, such as their policy number, e-mail address, mobile phone number. In some embodiments, the server computer 104 links record(s) of verified unique card ID(s) with record(s) of corresponding consumer(s) to facilitate establishment of proper incentive process and/or reward(s).

The server computer 104 can include one or more modules 108, including a Reverse Gift Card Processing Module. Modules can include software, hardware, or firmware (or combination thereof) system, process or functionality, or component thereof, that perform or facilitate the processes, features, and/or functions described herein. In some embodiments, individual mobile devices 110 can include one or more modules 108 for local processing. Each module 108 may include sub-modules. Software components of a module may be stored on a computer readable medium. Modules may be integral to one or more servers, or be loaded and executed by one or more servers. One or more modules may be grouped into an application, including an application on the mobile device.

The operating environment 100 can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 2:
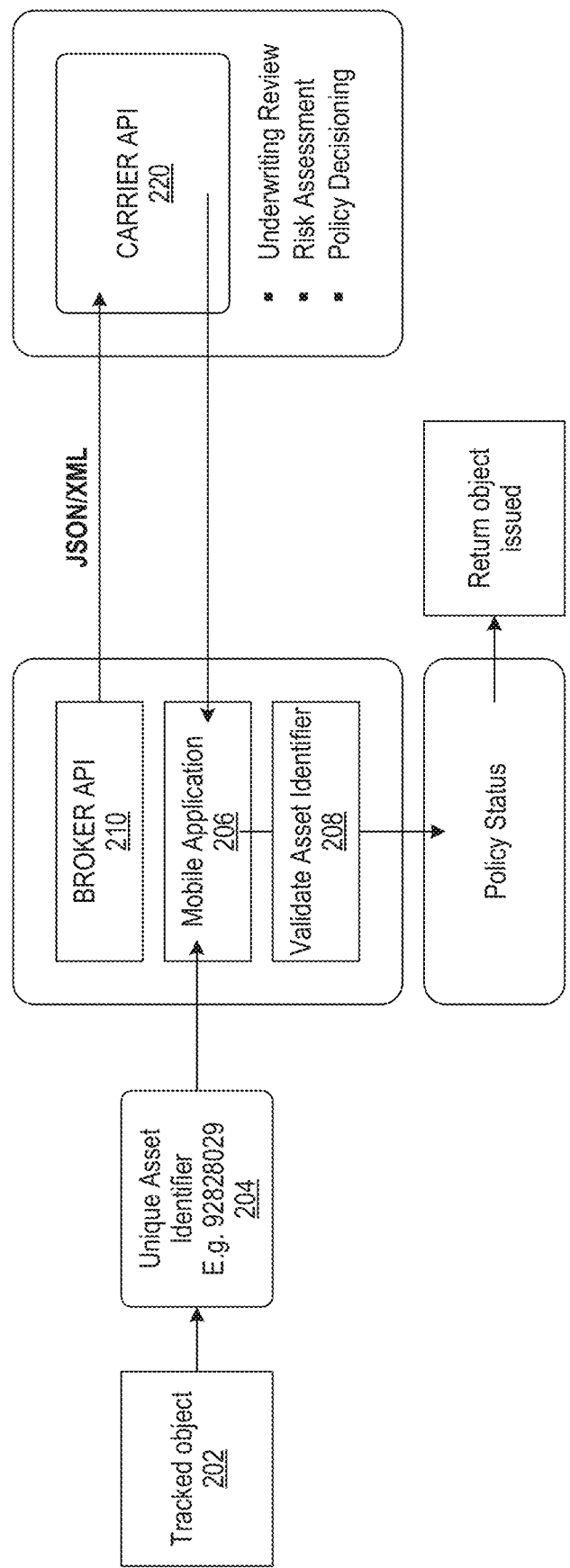
FIG. 2 is an example data flow process for implementing an incentive process, in accordance with some embodiments of the disclosed technology.
Figure 4A:
FIGS. 4A and 4B illustrate an example marketing asset with incentive, in accordance with some embodiments of the presently disclosed technology.
Figure 4B:
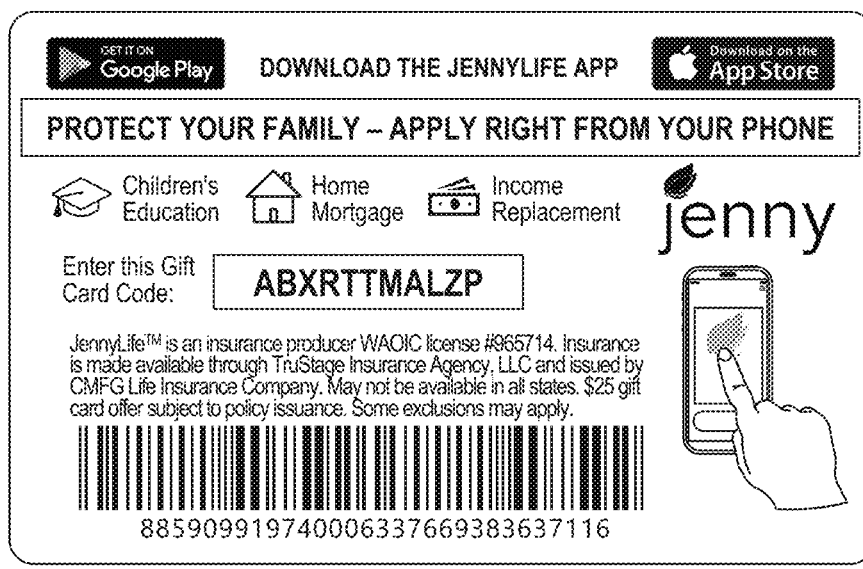
Figure 5:
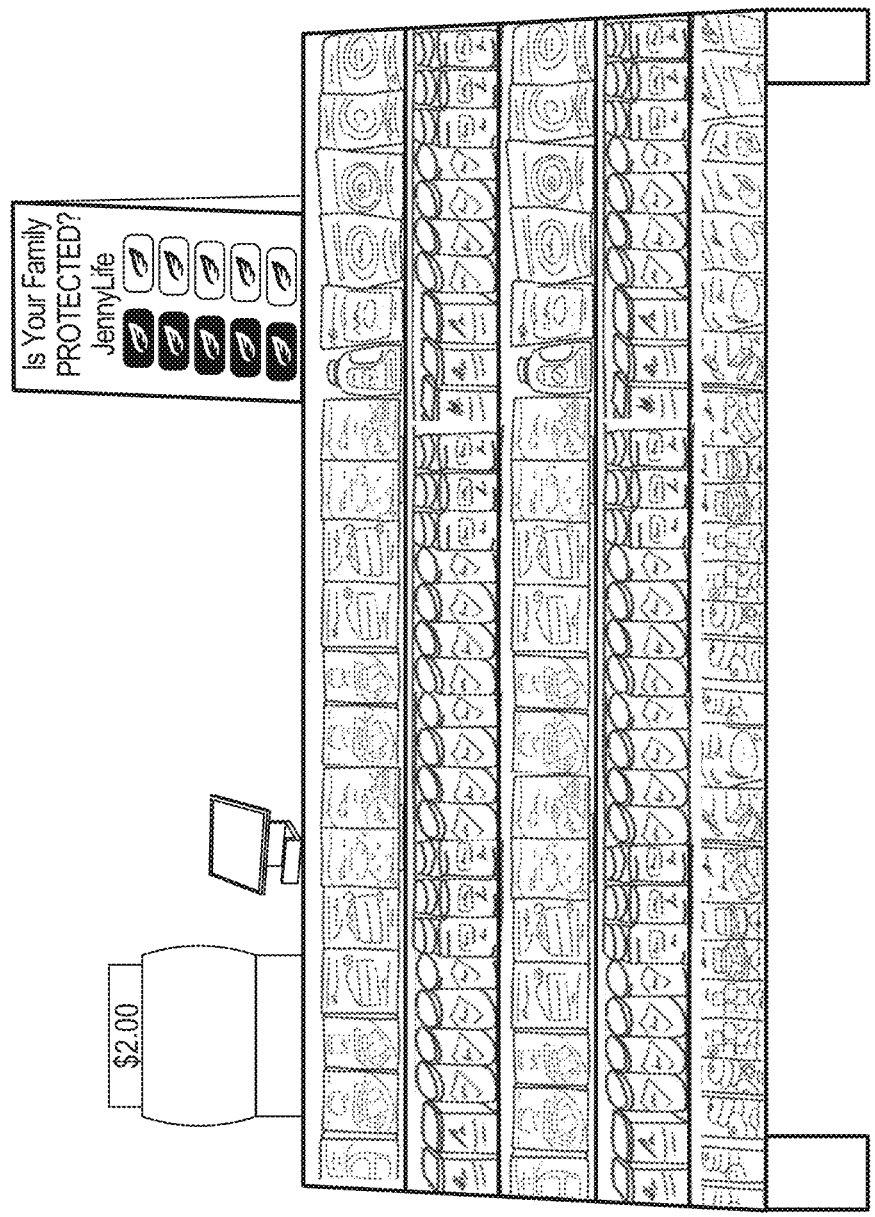
FIG. 5 shows an example presentation of marketing asset with incentive at a retailer, in accordance with some embodiments of the presently disclosed technology.

FIG. 2 is an example data flow process for implementing an incentive process, in accordance with some embodiments of the disclosed technology. With reference to FIG. 2, a broker-provided marketing asset with incentive is generated at block 202. As shown in FIGS. 4A and 4B, an example of the broker-provided marketing asset with incentive is a Jenny Life Card, which can be a plastic card that is displayed at the retail checkout line (FIG. 5). The card has an incentive on it. In this example that incentive is a $25 VISA® Gift Card if the consumer takes the card and signs up for life insurance and maintains the policy throughout a 30-day money back guarantee period.

At block 204, a unique asset identifier is associated with the broker-provided marketing asset with incentive. As shown in FIG. 4B, illustratively, the unique asset identifier can be represented by a randomly generated sequence of numbers printed on the back of the card. The printed sequence can be obfuscated. When the consumer takes the card home they can scratch off the back of a portion of the card which reveals the unique identifier (e.g., 92928029).

The consumer can input the unique asset identifier into a mobile application 206 running on a smart phone or other computing device. The mobile application 206 can be associated with a broker incentive clearinghouse (e.g., Jenny Life) and communicates with clearinghouse server(s). In some embodiments, the consumer types the unique asset identifier into a mobile application interface (e.g., via a Qwerty keyboard displayed thereon).

After information exchange between the mobile application 206 and the clearinghouse server(s), at block 208 the clearinghouse (e.g., via its server(s)) can validate the Unique Asset Identifier, including determining whether it is a valid identifier, whether it has been attempted to be used previously, and/or what retail location it came from. For example, once a valid identifier is determined, the clearinghouse server(s) will mark or denote in the backend that the corresponding card has been redeemed so that the identifier cannot be used again.

The clearinghouse (e.g., via its server(s)) can match applicant data to the Asset Identifier. Illustratively, the consumer becomes an applicant in the mobile application when they input personally identifiable information. The clearinghouse associates the applicant with the Unique Asset Identifier. This enables the application to, for all points forward, associate the incentive to the named applicant.

In order for the applicant to apply, the clearinghouse can use broker API(s) 210 (executing on clearinghouse server(s) and/or the mobile application 206) to transmit applicant data to insurance carrier API(s) 220. Illustratively, once the carrier receives the applicant application data, an underwriting review is conducted, a risk assessment is made, and a policy decision is made and transmitted back to the broker clearinghouse (e.g., to the mobile application 206, or to clearing house server(s) which then forwards to the mobile application 206).

Illustratively, once a positive policy decision is obtained in the mobile application 206, it enables the clearinghouse (e.g., via its server(s)) to denote in the clearinghouse the start of the applicant's Policy Status waiting period, which is can be legally 10 days (in the life insurance business this is called the required "free look" period), but the applicant has a moneyback guarantee period of 30 days.

The clearinghouse (e.g., via its server(s) and/or the mobile application 206) can monitor the status of the applicant policy application and can validate a response from the carrier API at day 30. Upon the clearinghouse validating the Policy Status as effectively having surpassed the waiting period the incentive will be released to the consumer/applicant (now a Policy holder). The Incentive, for example, a $25 VISA® Gift Card will be issued and mailed to the Policy Holder's physical address. After the incentive has been released to the policy holder, the unique asset identifier is deactivated in a corresponding clearinghouse database so the identifier cannot be used again. Also, a slotting fee (e.g., a SPIFF/SPIV) will be paid to the retailer where marketing asset was obtained.

Figure 3:
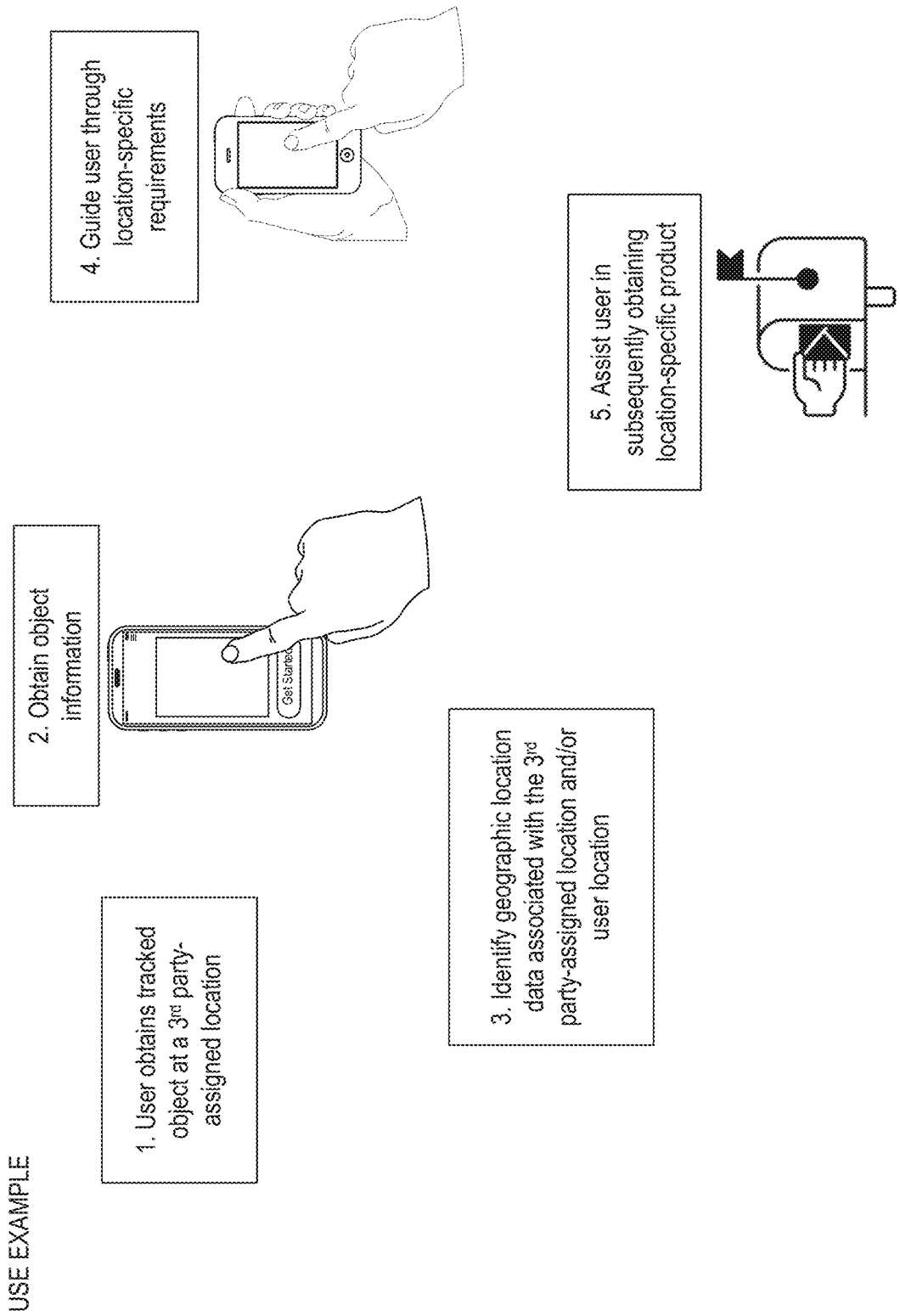
FIG. 3 shows example steps for implementing a retail card model to apply for insurance, in accordance with some embodiments of the disclosed technology.

FIG. 3 shows example steps for implementing a retail card model to apply for insurance, in accordance with some embodiments of the disclosed technology. First, a consumer can obtain a reverse gift card (e.g., a plastic gift card) at a retail POS. A unique card ID associated with the card is hidden (e.g., behind a scratch-off) and the consumer can scratch a portion of the card's back to reveal information about the unique card ID. Second, the consumer can apply for an insurance product (e.g., life insurance) via a mobile app. Third, while using the mobile app, the consumer can input the unique card ID into the mobile app. The unique card ID can provide information on where the card was retailed. The consumer applies for and is underwritten for the insurance product via the mobile app. The consumer has a "free lock" period (e.g., a 10-day legal "free lock" period and up to a 30-day moneyback guarantee) after purchasing the insurance product. Fourth, after the "free lock" period expires, a monetary reward (e.g., a $25 VISA gift card) is shipped to the consumer/insured. Fifth, the consumer can now spend the monetary reward in applicable ways.

Below is a nonexclusive list of applicable components involved with the presently disclosed technology:
- Point of Sale (POS) Register Terminal
- Broker database
- Broker front-end (e.g., mobile application)
- Broker API
- Broker-Provided Marketing Asset (card) w/Incentive (e.g. $25 VISA® Gift Card)
- Unique Asset Identifier (e.g., a unique card ID)
- Broker Incentive Clearinghouse (e.g., a platform that combines elements of Broker API, Broker Front-end, Broker database)
- Insurance Carrier database
- Insurance Carrier API Below is a nonexclusive list of parties involved with the presently disclosed technology:
- Consumer (e.g., customer before they apply)
- Retail location (e.g., a specific geo location)
- Retailer
- Insurance Carrier
- Insurance Broker and Clearinghouse
- Applicant (e.g., consumer in the act of applying for insurance)
- Policy Holder/Insured (e.g., the fully converted Applicant)

Figure 6:
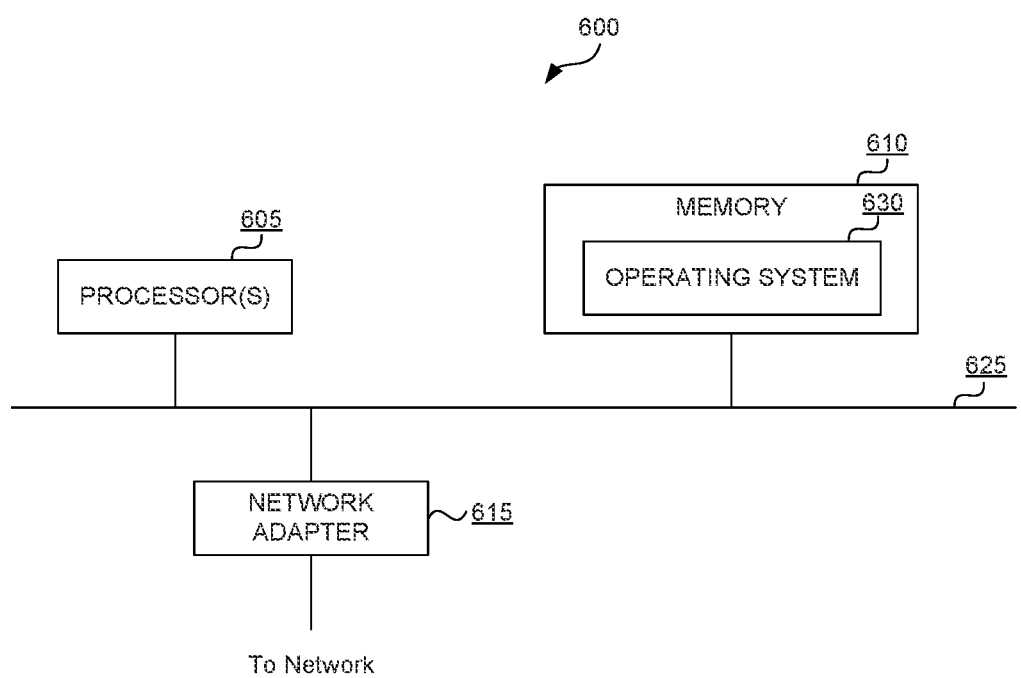
FIG. 6 is a block diagram illustrating an example architecture for a computer system that can be utilized to implement various portions of the present technology.

FIG. 6 is a block diagram illustrating an example architecture for a computer system 600 that can be utilized to implement various portions of the present technology. In FIG. 6, the computer system 600 includes one or more processors 605 and memory 610 connected via an interconnect 625. The interconnect 625 may represent any one or more separate physical buses, point to point connections, or both, connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 can be or include the main memory of the computer system. The memory 610 represents any suitable form of random access memory (RAM), read-only memory (ROM), flash memory, or the like, or a combination of such devices. In use, the memory 610 may contain, among other things, a set of machine instructions which, when executed by processor(s) 605, causes the processor(s) 605 to perform operations to implement embodiments of the present technology. In some embodiments, the memory 610 can contain an operating system (OS) 630 that manages computer hardware and software resources and provides common services for computer programs.

Also connected to the processor(s) 605 through the interconnect 625 is a (optional) network adapter 615. The network adapter 615 provides the computer system 600 with the ability to communicate with remote devices, such as the storage clients, and/or other storage servers, and may be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

All of the above U.S. patents, patent applications and publications referred to in this specification are incorporated herein by reference. Aspects can be modified, if necessary, to employ devices, features, and concepts of the various patents, applications, and publications to provide yet further embodiments. The systems disclosed herein can be used with different types of systems. Exemplary technology usable or adaptable for use with the systems disclosed herein are described in U.S. Provisional Application No. 62/637,065; U.S. Provisional Application No. 62/510,639; and U.S. patent application Ser. No. 15/986,331, which are incorporated by reference in their entities. In further embodiments, the methods disclosed herein can include receiving image data from a user in response to the user's interaction with user interfaces. The received image can be an image of a retail card, reverse gift card, identification card (e.g., a driver's license), or other image with data. The image can be transmitted to a remote computing device which analyzes the image based, at least in part, on communication between the remote computing device and one or more third-party computing resources as disclosed in U.S. Provisional Application No. 62/510,639 and U.S. patent application Ser. No. 15/986,331.

Moreover, technology disclosed herein can be incorporated into the systems of U.S. Provisional Application No. 62/510,639 and U.S. patent application Ser. No. 15/986,331. For example, the system 600 discussed in connection with FIG. 6 can be combined or used with the systems disclosed in U.S. patent application Ser. No. 15/986,331, such as the system for implementing a mobile insurance application shown in FIG. 1 of U.S. patent application Ser. No. 15/986,331. In some embodiments, for example, a computer-implemented method is performed by a portable computing device that is configured to communicate with at least one remote computing device. The method includes presenting a first set of user interfaces for inputting retail card information and an application for insurance. The computing device can receive image data from a user in response to the user's interaction with the first set of user interfaces. The method can further include receiving instructions from the at least one remote computing device for generating a second set of user interfaces based, at least in part, on the analysis of the retail card information and/or personally identifiable information. The computing device can generate and present the second set of user interfaces and can receive additional data from the user in response to the user's interaction with the second set of user interfaces. Still further, the method can include, concurrently with presenting the second set of user interfaces, transmitting at least a portion of the additional data to the at least one remote computing device. The at least a portion of the additional data is analyzed based, at least in part, on communication between the remote computing device and one or more third-party computing resources, and providing a result for the application for insurance based, at least in part, on the analysis of the at least a portion of the additional data. An incentive associated with the retail card information can be automatically sent to the user based on the personally identifiable information.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. All publications and patent applications mentioned herein are incorporated by reference in their entireties.

We claim:

1. A computer-implemented method performed by a portable computing device that is configured to track geographic locations of objects and/or related facilities, the method comprising:
   presenting a first set of user interfaces;
   receiving real-time image data from the first set of user interfaces, wherein the real-time image data corresponds to at least a tracked-object information;
   deriving at least one identifier of a tracked object based on decoding the received tracked-object information using the real-time image data, wherein the at least one identifier is at least initially included on the tracked object in a hidden form;
   identifying identification information based, at least in part, on the received image data;
   identifying a geographic location associated with the tracked object and/or the portable computing device based on the tracked-object information, the at least one identifier, and/or locating circuits within the portable computing device, wherein the geographic location represents a third-party assignment of the tracked object to a supplier;
   transmitting the tracked-object information, the geographic location, and identification information to at least one remote computing device, wherein at least one of the tracked-object information, the geographic location, and the identification information are analyzed based, at least in part, on communication between the remote computing device and one or more third-party computing resources;
   receiving instructions from the at least one remote computing device for generating a second set of user interfaces based, at least in part, on the analysis of at least one of the tracked-object information, the geographic location, and the identification information, wherein the second set of user interfaces are dynamically adjusted according to the geographic location;
   generating and presenting the second set of user interfaces;
   receiving additional data from the second set of user interfaces;
   concurrently with presenting the second set of user interfaces, transmitting at least a portion of the additional data to the at least one remote computing device, wherein the at least a portion of the additional data is analyzed based, at least in part, on communication between the remote computing device and one or more third-party computing resources; and
   providing a set of requirements associated with the geographic location and the tracked object based, at least in part, on the analysis of the at least a portion of the additional data.

2. The computer-implemented method of claim 1, wherein the tracked-object information is obtained from an identification device.

3. The computer-implemented method of claim 1, wherein the tracked-object information includes a unique identifier associated with a related supplier.

4. The computer-implemented method of claim 1, wherein the first set of user interfaces are predefined independent of at least one of the tracked-object information or the identification information of the user.

5. A non-transitory computer-readable medium storing content that, when executed by one or more processors, causes the one or more processors to perform actions comprising:
   presenting a first set of user interfaces;
   receiving real-time image data via the first set of user interfaces, wherein the real-time image data corresponds to at least a tracked-object information;
   deriving at least one identifier of a tracked object based on decoding the received tracked-object information using the real-time image data, wherein the at least one identifier is at least initially included on the tracked object in a hidden form;
   identifying identification information based, at least in part, on the received image data;
   identifying a geographic location associated with the tracked object and/or a user device based on the at least one identifier and/or a locating circuit within the user device, wherein the geographic location represents a third-party assignment of the tracked object to a supplier;

transmitting the at least one identifier and the geographic location to a remote computing device for obtaining location-specific requirements at least partially associated with the tracked object, wherein at least one of the at least one identifier, the geographic location, and the identification information are analyzed based, at least in part, on communication between the remote computing device and one or more third-party computing resources;

following receipt of the location-specific requirements, receiving instructions from the at least one remote computing device for presenting a second set of user interfaces based, at least in part, on the analysis of at least one of the tracked-object information, the geographic location, and the identification information, wherein the second set of user interfaces are dynamically adjusted according to the geographic location for complying with the location-specific requirements;

generating and presenting the second set of user interfaces;

receiving additional data via the second set of user interfaces;

concurrently with presenting the second set of user interfaces transmitting at least a portion of the additional data to the at least one remote computing device, wherein the at least a portion of the additional data is analyzed based, at least in part, on communication between the remote computing device and one or more third-party computing resources; and providing a set of requirements associated with the geographic location and the tracked object based, at least in part, on the analysis of the at least a portion of the additional data.

6. The computer-readable medium of claim 5, wherein the at least one identifier of the tracked object is derived from visual patterns that include at least one of an alpha-numerical code, a bar code, or a QR code.

7. The computer-readable medium of claim 5, wherein a format of the at least one identifier is revealable based on a user-prescribed process.

8. A system, comprising:
at least a memory storing computer-executable instructions; and
one or more processors that, when executing the instructions, are configured to:
present a first set of user interfaces;
receive real-time image data via the first set of user interfaces, wherein the received image data corresponds to at least a tracked-object information;
derive at least one identifier of a tracked object based on decoding the received tracked-object information using the real-time image data, wherein the at least one identifier is at least initially included on the tracked object in a hidden form;
identify identification information based, at least in part, on the received image data;
identify a geographic location associated with the tracked object and/or a user device based on the tracked-object information, the at least one identifier, and/or a locating circuit within the user device, wherein the geographic location represents a third-party assignment of the tracked object to a supplier;
transmit the at least one identifier and the geographic location to a remote computing device for obtaining location-specific requirements associated with the tracked objects, wherein at least one of the at least one identifier the geographic location, and the identification information are analyzed based, at least in part, on communication between the remote computing device and one or more third-party computing resources; and
following receipt of the location-specific requirements, receive instructions from the at least one remote computing device for presenting a second set of user interfaces based, at least in part, on the analysis of at least one of the tracked-object information, the geographic location, and the identification information, wherein the second set of user interfaces are dynamically adjusted according to the geographic location for complying with the location-specific requirements;
generate and present the second set of user interfaces for complying with the location-specific requirements;
receive additional data via the second set of user interfaces;
concurrently with presenting the second set of user interfaces, transmit at least a portion of the additional data to the at least one remote computing device, wherein the at least a portion of the additional data is analyzed based, at least in part, on communication between the remote computing device and one or more third-party computing resources; and
provide a set of requirements associated with the geographic location and the tracked object based, at least in part, on the analysis of the at least a portion of the additional data.

9. The system of claim 8, wherein the user device includes a mobile phone.

10. The system of claim 8, wherein the one or more processors are further configured to receive personally identifiable information associated with a user via the first set of user interfaces and/or the second set of user interfaces.

11. The system of claim 8, wherein the tracked-object information includes a representation of one or more letters and/or numbers on a surface of the tracked object, wherein the at least one identifier is derived based on the one or more letters and/or numbers.

12. The system of claim 8, wherein the second set of user interfaces is configured to guide the user for satisfying one or more conditions associated with obtaining a location-specific product associated with the tracked object.

* * * * *

UNITED STATES PATENT AND TRADEMARK OFFICE
CERTIFICATE OF CORRECTION

PATENT NO. : 11,263,701 B2
APPLICATION NO. : 17/237006
DATED : March 1, 2022
INVENTOR(S) : Pancholi et al.

Page 1 of 1

It is certified that error appears in the above-identified patent and that said Letters Patent is hereby corrected as shown below:

In the Specification

In Column 1, Line 3, above "This application" insert -- INCORPORATED APPLICATIONS --.

In the Claims

In Column 11, Lines 24-25, Claim 5, delete "interfaces" and insert -- interfaces, --.

In Column 12, Line 10, Claim 8, delete "objects," and insert -- object, --.

In Column 12, Line 11, Claim 8, delete "identifier" and insert -- identifier, --.

Signed and Sealed this
Seventeenth Day of May, 2022

Katherine Kelly Vidal
*Director of the United States Patent and Trademark Office*